July 1, 1930.  A. L. HARVEY  1,768,760
CONTROL SYSTEM
Filed Oct. 20, 1927
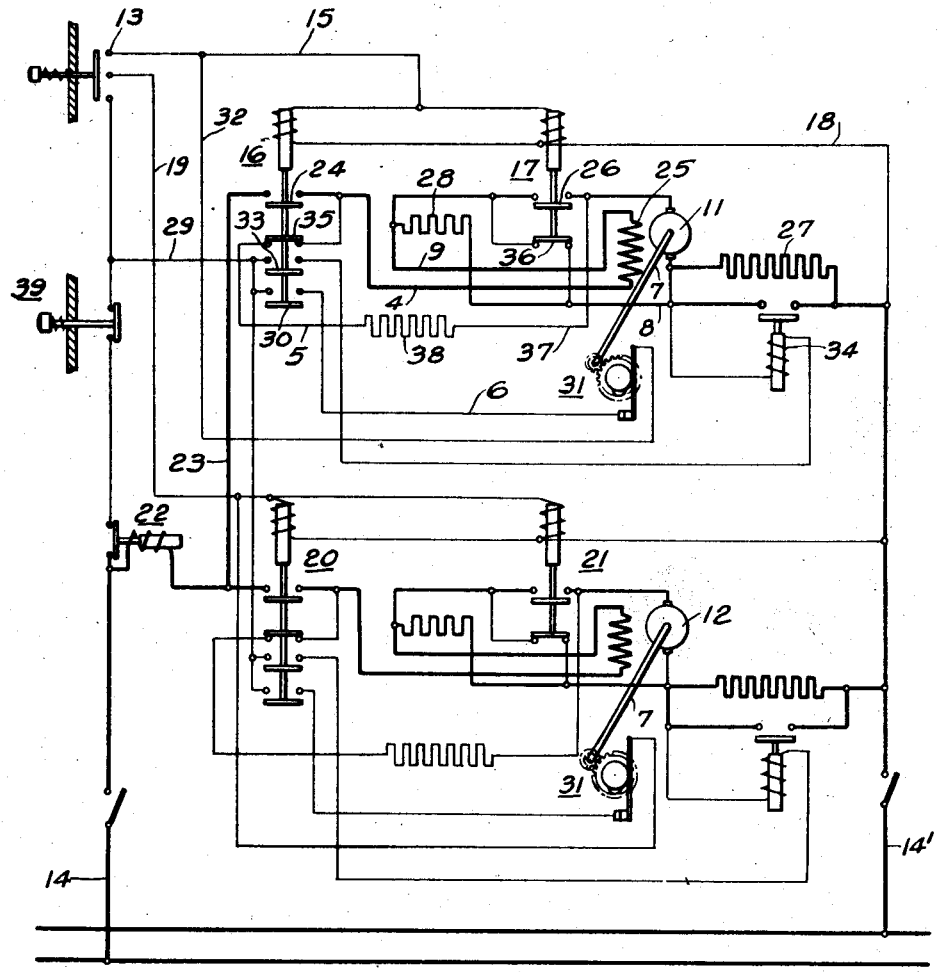
INVENTOR
*Albert L. Harvey.*
BY
ATTORNEY Patented July 1, 1930

1,768,760

UNITED STATES PATENT OFFICE

ALBERT L. HARVEY, OF LA GRANGE, ILLINOIS, ASSIGNOR TO WESTINGHOUSE ELECTRIC & MANUFACTURING COMPANY, A CORPORATION OF PENNSYLVANIA

CONTROL SYSTEM

Application filed October 20, 1927. Serial No. 227,408.

My invention relates generally to a system of control for a plurality of series motors and particularly to the dynamic braking of one of these motors under predetermined conditions without interrupting the operation of the others.

The object of the invention is to provide a system of control for a plurality of series motors.

A more specific object of the invention is to provide a system of control whereby two series motors may be started simultaneously and may be stopped individually through dynamic braking.

A further object of the invention is to provide for operating a series motor with its armature shunted through a resistor and provide for dynamic braking when it is desired to stop the motor.

Another object of the invention is to provide for automatically stopping one of a plurality of motors under predetermined conditions without interrupting the operation of the other motors.

For a complete understanding of the invention and the operation of its parts, reference may be had to the accompanying diagram which should be read in conjunction with the following description.

The motors 11 and 12 are arranged for parallel operation across the supply line 14 and 14'. The control circuits for the two motors are also connected in parallel with each other, and the operation of the various elements embodied in the control circuits will be exactly the same for each motor so that a description of the operation of the control circuit for one motor will suffice.

In order to start the motors 11 and 12, the push-button switch 13 is operated, and a plurality of switch-actuating circuits are established. As will be noted, one circuit extends from the positively energized conductor 14 through the contact members of overload relay 22, push-button switches 13 and 39, conductor 15, the actuating coils of the switches 16 and 17, connected in parallel, and conductor 18, to the negatively energized line 14'; while the other may be traced from the push button switch 13, through conductor 19, the actuating coils of switches 20 and 21, connected in parallel, to the negatively energized conductor 14'.

When the switches 16 and 17 are closed, power is applied to the motor 11 through the circuit extending from the positive supply-line conductor 14 through the actuating coil of the overload relay 22, conductor 23, contact member 24 of the switch 16, conductor 4, series field winding 25 of the motor 11, conductor 9 and, dividing at this point, a portion of the current travels through the contact member 26 of switch 17, the armature of the motor 11 and the starting resistor 27 to the negative side of the supply line. A circuit paralleling the armature of the motor 11 and the contact members 26, through which the remainder of the current travels, may be traced from the energized conductor 9 through the resistor 28, which is, at all times, connected in parallel with the armature of motor 11 when motoring, and conductor 8 to the negatively energized conductor 14'.

In order to maintain the switches 16 and 17 closed after the push-button switch 13 is released, provision is made for establishing a holding circuit. Further, with a view towards interrupting the motor circuit at predetermined times, any well known type of mechanically operated limit switch, such as illustrated at 31, is provided. In this embodiment of the invention, the switch 31 is disposed to be actuated by the motor 11 through a shaft 7.

Assuming now that the limit switch 31 is closed and that the push-button switch 13 is actuated, a holding circuit for the switches 16 and 17 is established which extends from the positively energized conductor 14, through conductor 29, contact member 30, conductor 6, limit switch 31, conductors 32 and 15, the actuating coils of switches 16 and 17 connected in parallel and conductor 18, to the negatively energized conductor 14'. Another auxiliary circuit may be traced which extends from conductor 29 through contact members 33 to the actuating coil of switch 34 and thence to the negatively energized conductor 14'.

The switch 24 is utilized as an accelerating switch and it short-circuits the starting resistor 28 after the motor has gained sufficient speed to operate safely under the full line voltage.

When the motor 11 has made a predetermined number of revolutions, the mechanically operated limit switch 31, which is connected in the holding circuit, as described hereinbefore, is actuated and breaks the holding circuit, thereby permitting the switches 16 and 17 to open and interrupt the motor circuit and the auxiliary circuits. However, when the switches 16 and 17 are in their open positions (as shown) the interlocks 35 and 36 stand in their circuit-closing positions. The circuit established by the interlocks, when the switches 16 and 17 are in their open positions, connects the motor 11 for dynamic braking without interrupting the operation of motor 12. It will be seen that the opening of the switches 16 and 17 reverses the connection of the series field winding 25 with reference to the armature of motor 11 so that the motor, operating under its back electromotive force, excites the field in the same direction as previously. The dynamic-braking circuit may be traced from motor 11, through conductor 37, braking resistor 38, conductor 5, contact member 35 of switch 16, conductor 4, series field winding 25, conductor 9 and the contact members 36 back to the motor 11.

The starting of the motor 12 is effected in a manner similar to that described for the motor 11, and the motor may be interrupted at a predetermined time by a mechanically operated limit switch. As shown, the actuating coils of switches 16 and 17 for motor 11 are connected in parallel with the actuating coils of switches 20 and 21 for the motor 12 and are all energized to establish the circuits required to start the motors 11 and 12 when the push-button switch 13 is closed.

When it is desired to stop both motors together, the stopping push-button switch 39 may be depressed, thereby interrupting the control circuits for both motors simultaneously, while the limit switches interrupt the motor circuit independently. Regardless of how the motors are stopped, it will be seen that the dynamic-braking connections are automatically established upon the opening of the main switches 16, 17, 20 and 21, which action occurs in both methods of stopping.

An over-loaded relay 22 is provided for the protection of the motors and is inserted in the system so that the control circuits for both motors are broken when an excessive line current is drawn. The coils of this over-load relay are connected in series with the motors, so that the current for both motors passes through them.

It will be recalled that both motors must be started simultaneously, since there is but one starting means provided and the control circuits for the two motors are connected in parallel. However, the mechanically operated limit switches are connected, each in its respective branch of the paralleled control circuits, so that, when one motor has rotated to a predetermined position, the supply circuit to that motor may be broken without interrupting the operation of the other, and dynamic braking of the disconnected motor is automatically effected.

Since a number of modifications, which will accomplish the same result as the embodiment set forth above, will be apparent to those skilled in the art, it is desired that this description be construed only as illustrative and not in a limiting sense.

I claim as my invention:

1. In combination, a series motor, starting means comprising line switches and a manual controller for connecting said motor to a source of electric power supply, a resistor disposed to be connected in parallel-circuit relation to the armature of said motor through the operation of one of said line switches when the motor is connected to the power supply, means mechanically actuated by the motor for stopping said motor, a braking resistor, and means associated with said line switches for shunting the parallel-connected resistor and connecting the braking resistor in series with the armature and series field windings of the motor to effect dynamic braking.

2. In a system of control for parallel-operated motors provided with series-field windings, in combination, means for starting all the motors simultaneously, means separately actuated by the motors for automatically stopping the motors individually when the respective motors have made a predetermined number of revolutions, means operable to control said starting means to stop the group of motors simultaneously, an armature-shunt resistor and a dynamic-braking resistor for each motor, and automatic means disposed in cooperative relation to said starting means responsive to the operation of the individual or group stopping means for alternately establishing armature-shunt circuits and dynamic-braking circuits without reversing the direction of flow of current through the series-field windings of the motors.

3. In a motor-control system for a plurality of motors to be started collectively and stopped individually and collectively, in combination, a plurality of motors provided with series-field windings, a source of power for the motors, line switches for individually connecting the motors to the power source, an armature-shunt resistor and a dynamic-braking resistor for each motor, means responsive to the closure of one of the line switches for connecting the armature-shunt resistor across the motor armature, said means being disposed to partially establish a dynamic-braking circuit in response to the opening of the switch, means responsive to the opening of the other line switch for completing the dynamic-braking circuit through the motor armature and series-field winding, a manually-operable switch for effecting a group operation of the line switches of all the motors, and limit switches mechanically actuated by each motor for controlling the operation of the line switches of each motor individually, said limit switches being disposed to effect the opening of the respective pairs of line switches after a predetermined number of motor revolutions, thereby to disconnect the armature-shunt resistors and establish dynamic-braking circuits simultaneously.

4. In a control system for a plurality of motors provided with series-field windings, in combination, a source of power, said motors being connected in parallel-circuit relation to the power source, starting switches for the motors, a manually-operable switch for controlling the operation of the starting switches of all the motors, an armature-shunt resistor for each motor, said resistors being disposed to be connected in shunt-circuit relation to their respective motor armatures through the operation of certain of the starting switches, a dynamic-braking circuit for each motor comprising a dynamic-braking resistor and the series-field winding, said circuit being controlled by other of said starting switches, and means disposed to be actuated by the motors individually for effecting an opening operation of the starting switches for each motor, thereby to disconnect the armature-shunt resistors and establish the dynamic-braking circuits through the series-field windings of the motors without changing the direction of the fields.

5. In a control system for a plurality of series motors, in combination, a source of power, said motors being independently connected to the power source, a plurality of starting switches for each motor, a manually-operable switch disposed to effect the operation of the switches for all the motors, an armature-shunting resistor for each motor, one of said starting switches being disposed to connect said armature-shunting resistor in the motor circuit when operated to energize the motor, a dynamic-braking resistor, another of said starting switches in conjunction with said first switch being disposed to connect the resistor in shunt relation to the motor when operated to deenergize said motor, and a limit switch for each motor, said switches being actuated by the motors and disposed to effect the opening of the starting switches for each motor, thereby to render the armature-shunt circuit ineffective and establish a dynamic braking circuit through the series-field windings of the motors without changing the direction of field flux.

In testimony whereof, I have hereunto subscribed my name this 8th day of October, 1927.

ALBERT L. HARVEY.